March 28, 1950     A. J. BENT     2,501,755
VALVE MECHANISM
Filed Aug. 16, 1943
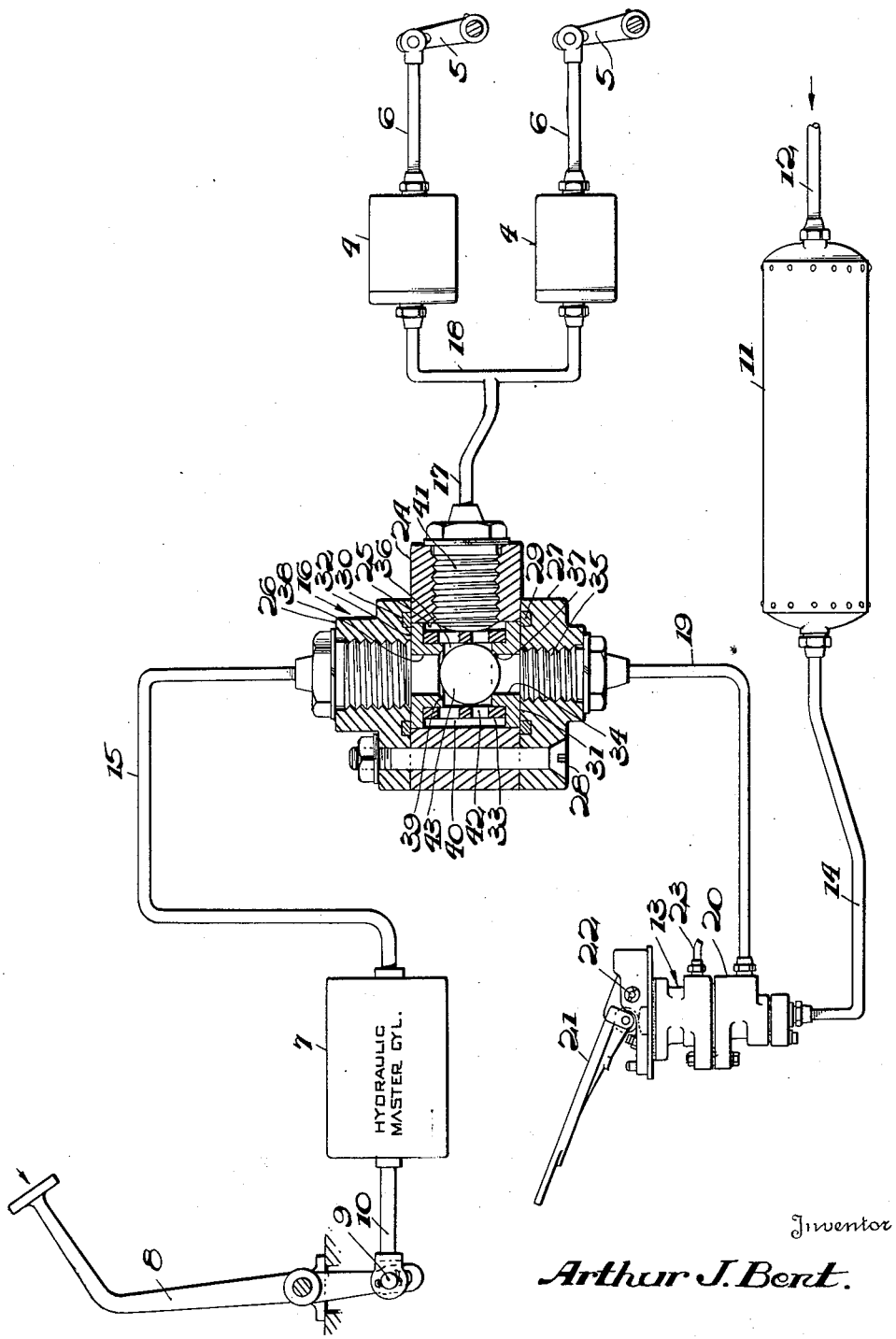
Inventor
*Arthur J. Bent.*
By *W. D. Parker, Jr.*
Attorney

UNITED STATES PATENT OFFICE 2,501,755

VALVE MECHANISM

Arthur J. Bent, Wilkinsburg, Pa., assignor to Bendix-Westinghouse Automotive Air Brake Company, Elyria, Ohio, a corporation of Delaware Application August 16, 1943, Serial No. 498,853

1 Claim. (Cl. 251—118)

This invention relates primarily to fluid pressure control mechanism, and more particularly to fluid pressure control mechanism for the brakes of an airplane.

It has previously been proposed to provide, in connection with an airplane equipped with hydraulic brakes of more or less conventional type, a separate fluid pressure supply such as compressed air, the separate or emergency fluid pressure supply being controlled by a suitable control valve convenient to the operator. In addition to the foregoing, in view of the necessity of preventing any leakage of hydraulic fluid from the hydraulic system, it has been necessary to provide suitable valve mechanism in order to isolate the hydraulic portion of the system from the balance of the system, and it is accordingly an object of the present invention to provide valve means of this type, known more commonly as a double check valve, which will efficiently prevent leakage of the hydraulic fluid into the auxiliary portion of the system, and at the same time permit efficient operation of the system either from the regular or auxiliary fluid pressure source.

A further object of the invention is to provide a double check valve for use in a system of the above type, so constituted as to minimize leakage from one portion of the system to another.

A still further object of the invention is to provide, for use in a system of the above type, a double check valve wherein a single valve element is positively positioned to normally prevent communication between the hydraulic portion of the system and the balance of the system.

Yet another object of the invention is to provide, in a check valve of the above type, means for insuring positive seating of the valve without necessitating the use of springs or other delicate parts in order to obtain this desirable type of operation.

These and other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claim.

In the drawing, the invention is illustrated in connection with a brake system for an airplane, not shown, wherein a pair of brake actuators or cylinders 4 connected to brake levers 5 through the medium of piston rods 6, are adapted to be supplied with fluid pressure from a hydraulic master cylinder 7, of conventional type, the piston of the master cylinder being actuated by means of a brake pedal 8 having a pivotal connection 9 with a piston rod 10 of the master cylinder. An auxiliary source of fluid pressure is also provided which includes a reservoir 11 supplied with fluid pressure from a compressor, not shown, through a conduit 12, the flow of fluid pressure from the reservoir being controlled by means of a control valve 13 connected thereto by means of a conduit 14. The master cylinder is connected with the actuators through a conduit 15, a double check valve 16, to be described hereinafter, a conduit 17 and a conduit 18, while the control valve 13 is connected with the brake actuators through a conduit 19, the valve 16, and conduits 17 and 18.

The control valve 13 is of well-known construction and may preferably be constructed in accordance with the principles set forth in the patent to William J. Andres and Roy S. Sanford, No. 2,133,275, dated October 18, 1938. This valve is provided with a casing 20 having an operating pedal 21 pivotally mounted thereon by means of a pivot pin 22, and is furthermore provided with an exhaust conduit 23, and it will be understood, on reference to the above patent, that the valve is of the so-called self-lapping type, and that with the control pedal in the position shown, the valve mechanism serves to prevent communication between conduits 14 and 19 and to permit communication between conduits 19 and 23, while on depression of the pedal, the valve mechanism serves to prevent communication between conduits 19 and 23 and to permit communication between conduits 14 and 19 to establish a pressure in the latter conduit substantially proportional to the degree of movement of the control pedal. Thus in the embodiment shown, power operation is available under the control of the valve 13, while manual operation of the brakes is available on operation of the brake pedal 8.

In connection with previous installations of this type, it has been proposed that the auxiliary fluid pressure supply comprise a reservoir or bottle of compressed gas such as air, and it is accordingly necessary to provide interconnecting means for the conduits 15, 17 and 19 so constituted as to prevent any leakage whatsoever from the conduits 15 and 17 into the conduit 19 during normal manual operation by means of the hydraulic system, as it is well-known that the reserve capacity of the conventional hydraulic system is such that leakage of any appreciable amount of fluid therefrom will decrease the efficiency of the system, while entrance of air or other gas into the hydraulic system will likewise decrease the efficiency of the system and result in a so-called soft or spongy pedal. Since it may be possible under certain conditions, particularly under conditions of extreme temperature variations, for a partial vacuum to be developed in the conduit 15 on a sudden release of the brake pedal 8, it will be understood that any means used to isolate one portion of the system from the other must be so constituted as to prevent the entrance of air or gas into the hydraulic system under the above type of operation, and the double check valve 16 is accordingly so constituted as to overcome these difficulties.

As illustrated in the drawing, the double check valve is provided with a body portion or casing 24, preferably made of non-magnetic material, the casing being provided with a bore 25 closed at its upper and lower ends by means of end plates 26 and 27, likewise preferably of non-magnetic material, these plates being clamped to the casing by means of bolts such as 28, leakage between the plates and the casing being prevented by suitable gasket rings 29 and 30 as shown. Valve seats 31 and 32, made of magnetic materials such as iron or steel, are positioned in the bore 25, as shown, and on assembly of the valve mechanism, are maintained in the position shown by means of a sleeve 33 interposed between the upper and lower faces of the seats respectively, and so dimensioned as to insure contact between the outer ends of the seats and the inner faces of plates 26 and 27, leakage at this point being prevented by contact between the outer periphery of the seats and the gaskets 29 and 30. The seat member 31 is provided with a bore 34 connected at its lower end with an inlet port 35 formed in the plate 27, and at its upper end with a chamber 36 formed by the sleeve and the seat members, the upper end of the bore being provided with a valve seat 37 as shown. In like manner, the seat member 32 is provided with a bore 38, similarly connected, as well as with a valve seat 39 formed in the lower end thereof. The sleeve 33 is so dimensioned as to form, in connection with the bore 25, an annular chamber 40 in communication with an outlet port 41 formed in the member 24, communication between the chamber 36 and the chamber 40 being provided by means of slots 42 formed in the wall of the sleeve. A valve element 43, of magnetic material and illustrated in the present embodiment as being in the form of a ball, is positioned in the bore of the sleeve 33, the bore of the sleeve being so dimensioned in relation to the diameter of the ball as to serve as a guide in order to substantially prevent lateral movement of the ball and to permit movement of the ball along the vertical center line of the sleeve from one valve seat to the other, the valve seats being spaced as shown in order to permit the flow of fluid pressure through the bore 38 of the upper valve seat when the valve is in the position shown.

As shown, the valve seat members 31 and 32 are provided with annular flanged portions which are respectively engaged by opposite ends of the valve guide 33. By the use of this construction, and together with the closure members 26 and 27, the seat members and guide are properly positioned in the casing for effective operation, yet the parts may be quickly and readily disassembled for inspection, repair or replacement.

Since the valve seats 31 and 32 are made of magnetic material and the valve element is also made of magnetic material, it will be understood that the valve seats may be made in the form of permanent magnets if desired, or if preferred, the valve itself may be made in the form of a permanent magnet. Assuming that the valve seats are constructed as permanent magnets, it will be apparent that with the valve element in the position shown, the latter will be held against the valve seat 37 with a force determined by the design of the permanent magnet 31 as well as by the type of material utilized in the construction of the valve element, this force tending to maintain the valve on its seat in such a manner as to substantially prevent leakage from the chamber 36 into the inlet port 35. In like manner, movement of the valve to the other end of the chamber 36, such as would occur on the application of fluid pressure to the port 35 through the conduit 19, will result in the valve being attracted to the lower end of the permanent magnet 32, with the result that the valve will adhere to the seat 39 under the action of a similar force. Thus in either position of operation, the valve is definitely positioned on the valve seat and is maintained in this position with a force sufficient to substantially prevent leakage by the valve, this being accomplished without the utilization of any moving parts other than the valve itself. In the event it is desirable to construct the valve element in the form of a permanent magnet, it will be understood that the seat members 31 and 32, made of magnetic material, will then cooperate with the valve as armatures, and that the same result will be obtained.

During normal operation with the double check valve arranged as shown, it will be seen that operation of the brake pedal 8 will serve to pump hydraulic fluid from the master cylinder 7 to the actuators 4 through the conduit 15, port 35, chamber 36, slots 42, outlet port 41 and conduits 17 and 18, leakage of hydraulic fluid into the conduit 19 through ports 34 and 35 being prevented by contact of the valve 43 with the seat 37, this contact being maintained with a considerable degree of force by virtue of the magnetic attraction between the valve and the seat member. It will also be noted that in the event a vacuum is produced in the hydraulic lines on release of the brake pedal, as may possible occur under certain types of operation, the valve 43 will be held on its seat with sufficient force to prevent the possibility of the ingress of air or other gas into the hydraulic portion of the system. In the event of failure of the hydraulic line 15 on the hydraulic master cylinder 7, the operator has only to operate the pedal 21 of the control valve 13 to supply compressed fluid to the double check valve through the conduit 19 and the inlet port 35, the pressure of the fluid acting on the lower portion of the valve serving to overcome the magnetic attraction and to force the valve upward against the seat 39 while the magnetic attraction between the seat member 32 and the valve then becomes effective to maintain the valve positively in this position until such time as a predetermined degree of fluid pressure is again supplied to the double check valve through the conduit 15 sufficient to overcome the magnetic attraction and again force the valve downward to the position shown. With the valve in the upper position, the fluid pressure supplied to the check valve by the operation of the control valve 13 flows to the actuators 4 through the chamber 36, the slots 42, the outlet port 41 and the conduits 17 and 18, release of the brakes being accomplished in the reverse manner on release operation of pedal 21, in which event the fluid pressure is exhausted to atmosphere through the exhaust conduit 23 in accordance with the operation of the control valve as previously described.

It will be readily understood from the foregoing that a novel and efficient arrangement has been provided wherein the brakes may be operated normally by means of a conventional hydraulic brake system, emergency operation on failure of a portion of the hydraulic system being available to the operator through the medium of the compressed fluid stored in the reservoir 11 and controlled by the operation of control valve 13, the novel arrangement of the double check valve serving to positively isolate one portion of the system from the other in order to ordinarily prevent the intermingling of the two actuating fluids which are utilized. In the event it is necessary to utilize the emergency portion of the system, it will be understood that the admission of compressed gas to the conduits 17 and 18, which are normally filled with hydraulic fluid, will in no way interfere with the satisfactory operation of the system, since in any case servicing of the hydraulic portion of the system will be necessary before the latter can again be successfully operated after a failure of the above type has occurred. While the double check valve has been illustrated as being provided with valve seats in the form of permanent magnets cooperating with a valve element constructed of magnetic material, it is to be pointed out that the invention is not limited to this particular construction and that the relation of the above parts can be readily reversed in such a manner that the valve element is constructed in the form of a permanent magnet, not necessarily in the shape of a ball, the valve seat members being constructed of magnetic material in order to cooperate with the permanent magnet forming the valve element. While the above control system has been described in connection with combined operation by a hydraulic and a gaseous fluid, it will also be apparent that the mechanism described will be equally efficient in isolating the two portions of the system in the event similar fluids are utilized in both the service and emergency portions of the system, and that such an arrangement will be particularly efficient in the event liquids of different types are utilized in the two portions of the system having such characteristics as to render it undesirable to permit intermixing of these liquids during normal operation of the system.

While the invention has been illustrated and described herein with considerable particularity, it is to be understood that the same is not limited to the forms shown but may receive a variety of mechanical expressions as will readily appear to those skilled in the art. Reference will, therefore, be had to the appended claim for a definition of the limits of the invention.

What is claimed is:

A double check valve comprising a casing having an outlet port, a bore in the casing connected intermediate its ends with said outlet port, a pair of oppositely disposed permanent magnets in said bore provided with inlet ports, each magnet provided with an annular flange, a single unitary ball valve of magnetic material in said bore adapted to alternately engage said ports, a tubular valve guide interposed between said magnets and engaging the flanges thereof for maintaining a spaced relationship therebetween and for guiding the movement of said ball valve therebetween, said valve guide having a plurality of ports in the wall thereof connecting the interior of the guide with the outlet port, means including closure members attached to the casing for positioning said permanent magnets and valve guide therein, and an inlet port formed in each closure member and registering respectively with the ports in said magnets.

ARTHUR J. BENT.

REFERENCES CITED

The following references are of record in the file of this patent:

UNITED STATES PATENTS

| Number | Name | Date |
| --- | --- | --- |
| 850,738 | Dempster | Apr. 16, 1907 |
| 870,806 | Turner | Nov. 12, 1907 |
| 1,080,027 | Van Sinderen | Dec. 2, 1913 |
| 1,199,840 | Turner | Oct. 13, 1916 |
| 1,319,787 | Moran | Oct. 28, 1919 |
| 1,530,487 | Fitch | Mar. 24, 1925 |
| 1,606,355 | Fisher | Nov. 9, 1926 |
| 1,750,159 | Broadhurst | Mar. 11, 1930 |
| 1,812,587 | Ellis | June 30, 1931 |
| 2,017,086 | Zouck | Oct. 15, 1935 |
| 2,216,809 | Derby | Oct. 8, 1940 |
| 2,300,694 | Overbeke | Nov. 3, 1942 |
| 2,311,851 | McClure | Feb. 23, 1943 |
| 2,358,228 | Hoof | Sept. 12, 1944 |

FOREIGN PATENTS

| Number | Country | Date |
| --- | --- | --- |
| 212,570 | Germany | Aug. 5, 1909 |